Jan. 22, 1952 W. W. TRANTER ET AL 2,583,241
VEGETABLE DIGGER
Filed March 23, 1949 6 Sheets-Sheet 1
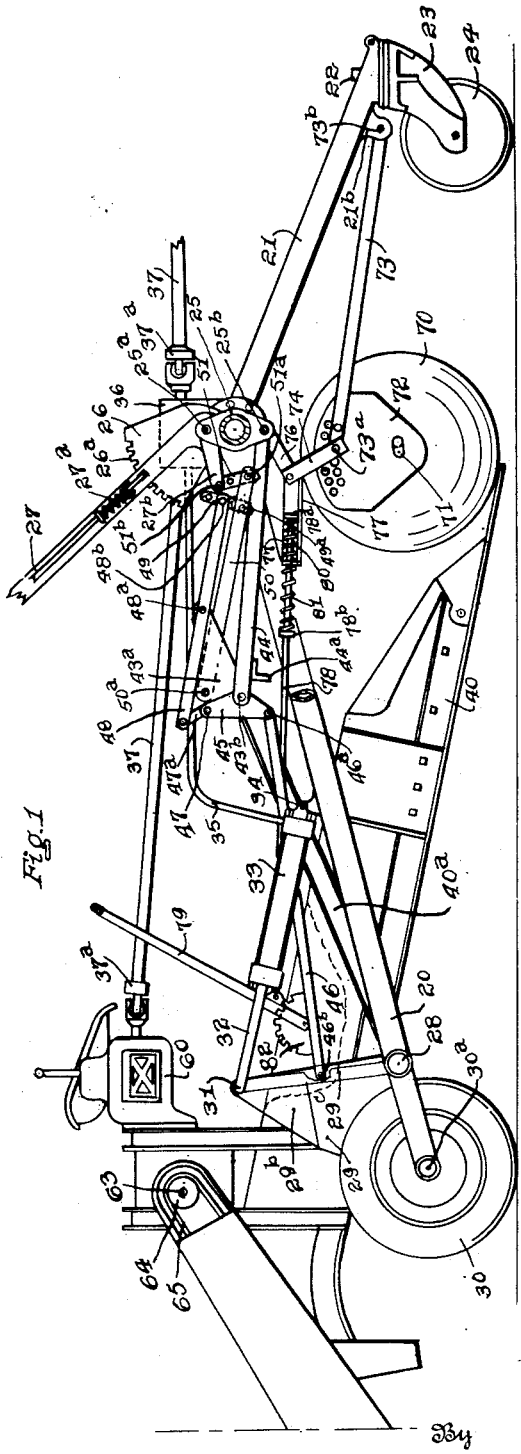
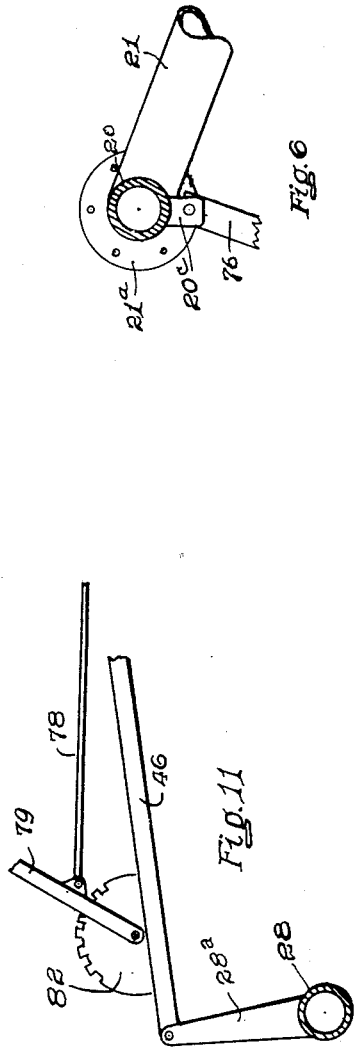
Inventor
Watson W. Tranter
Harry C. Hollinger
By
Walter W Burns
Attorney

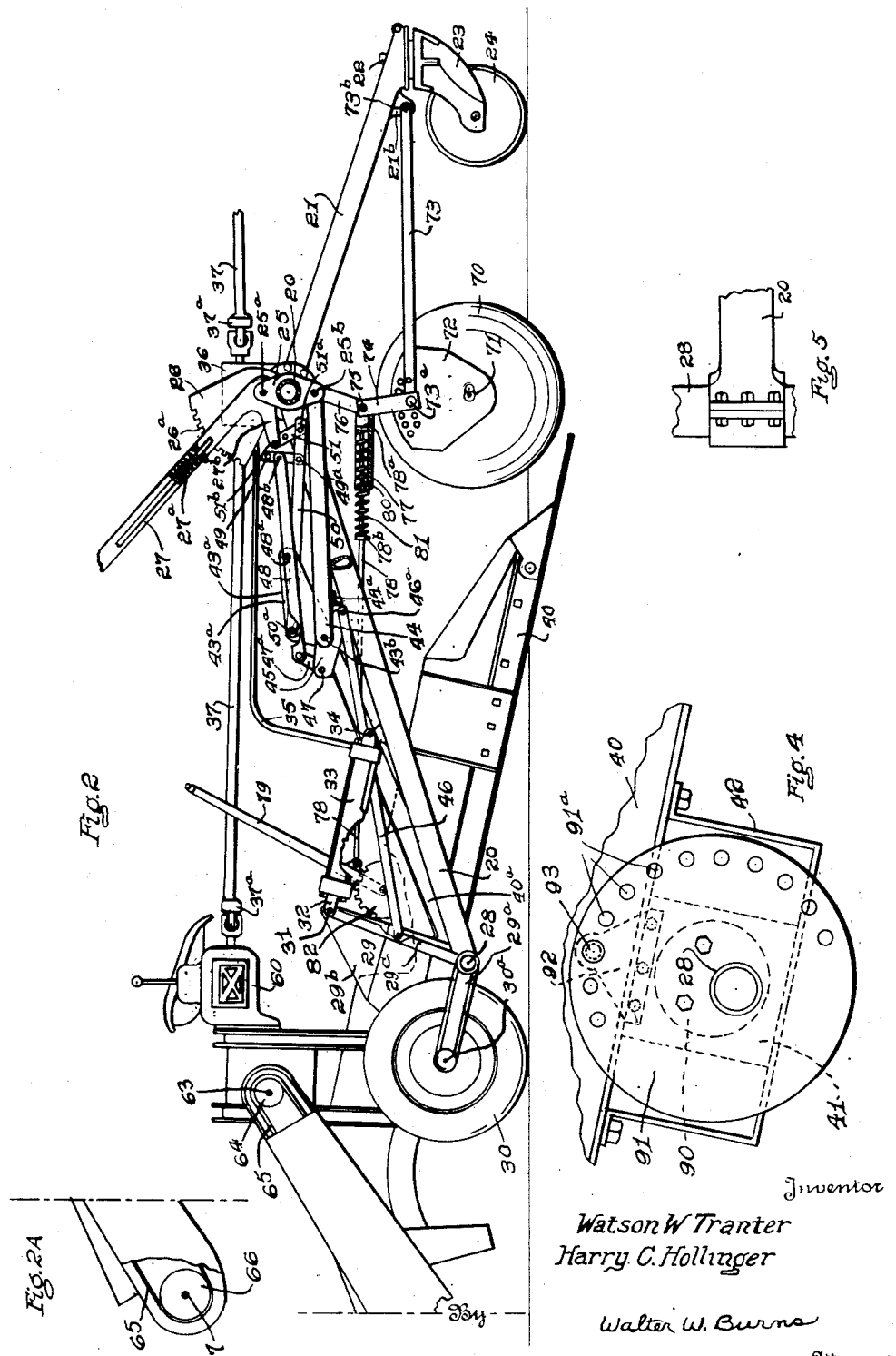

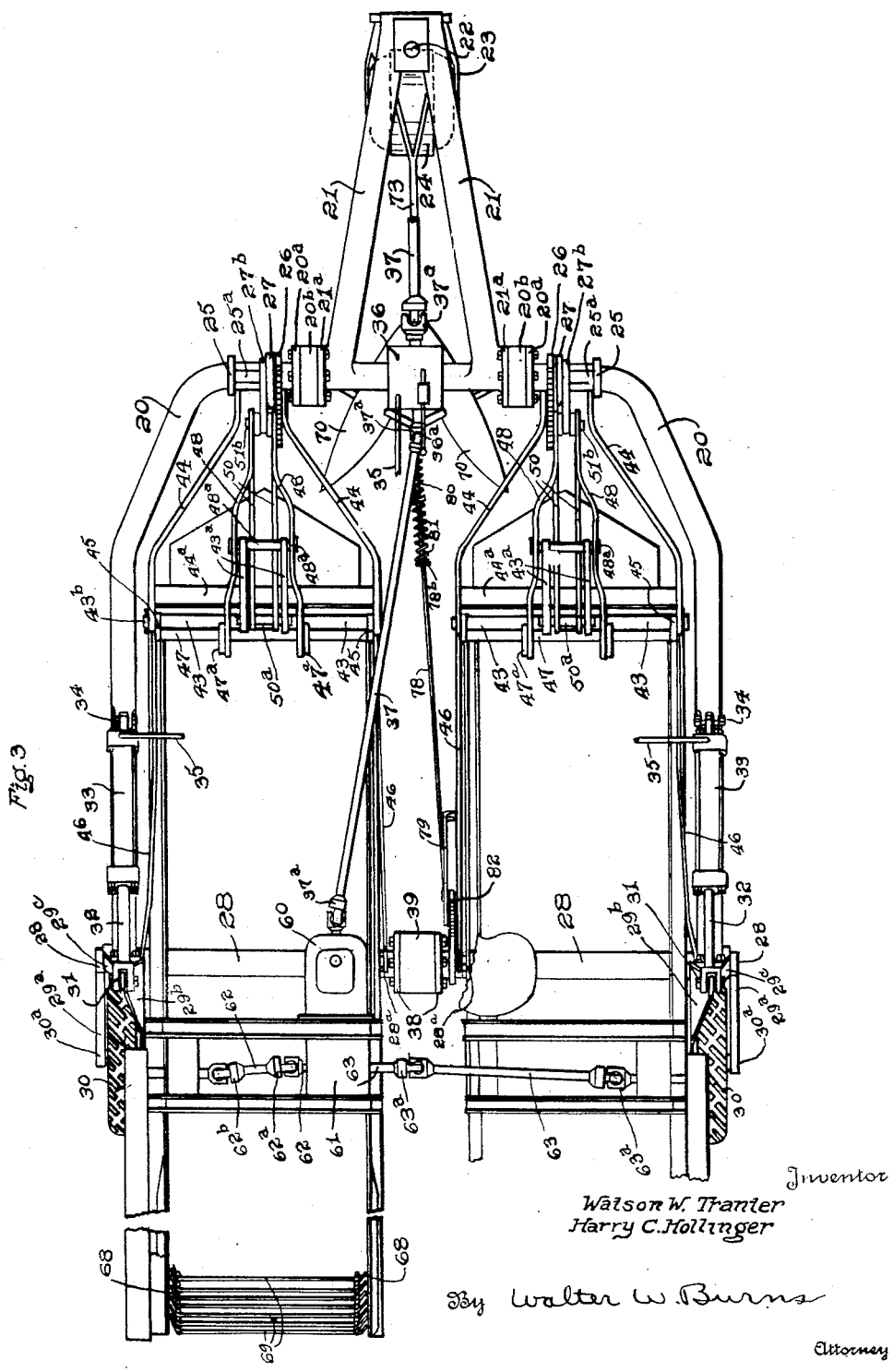

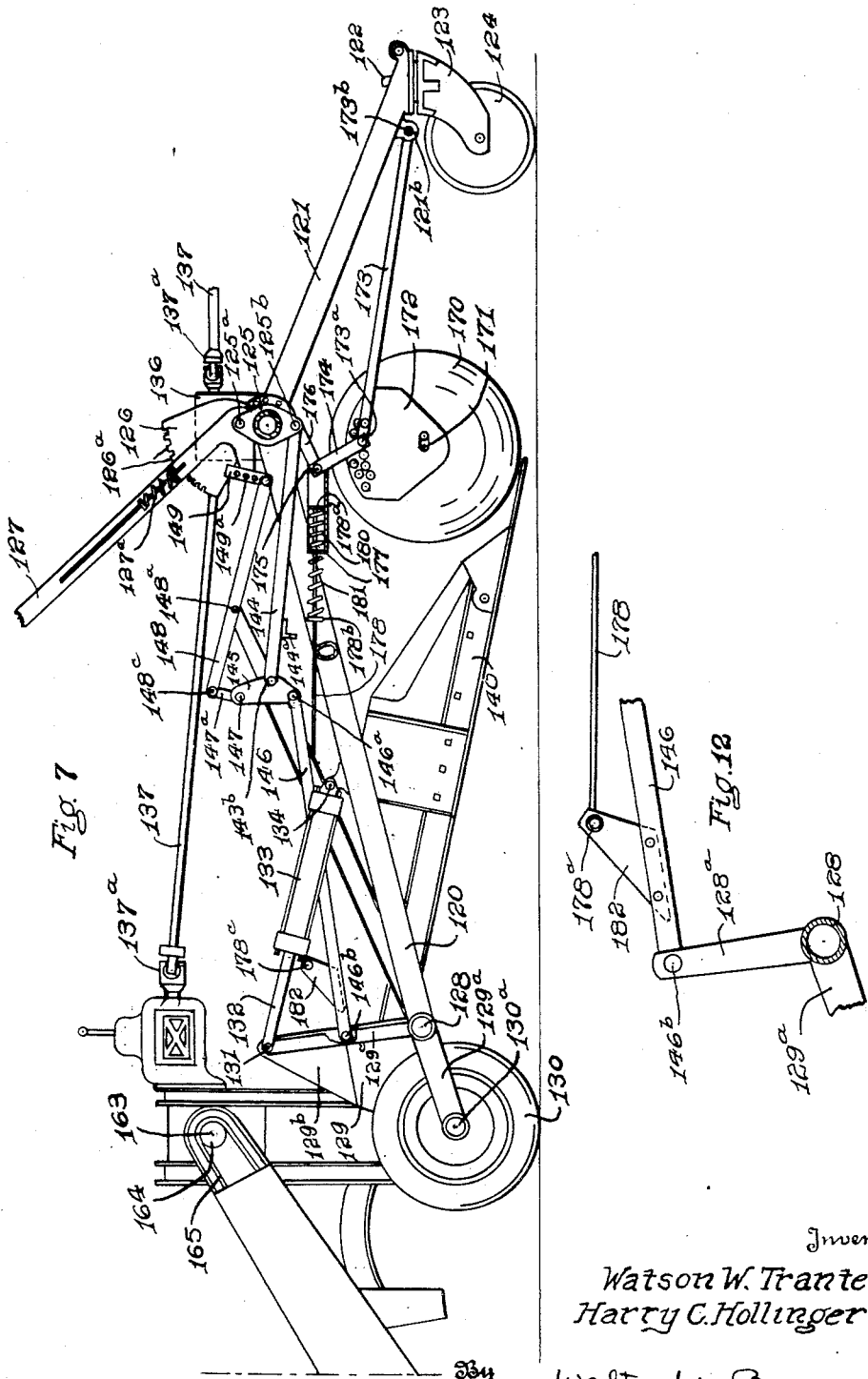

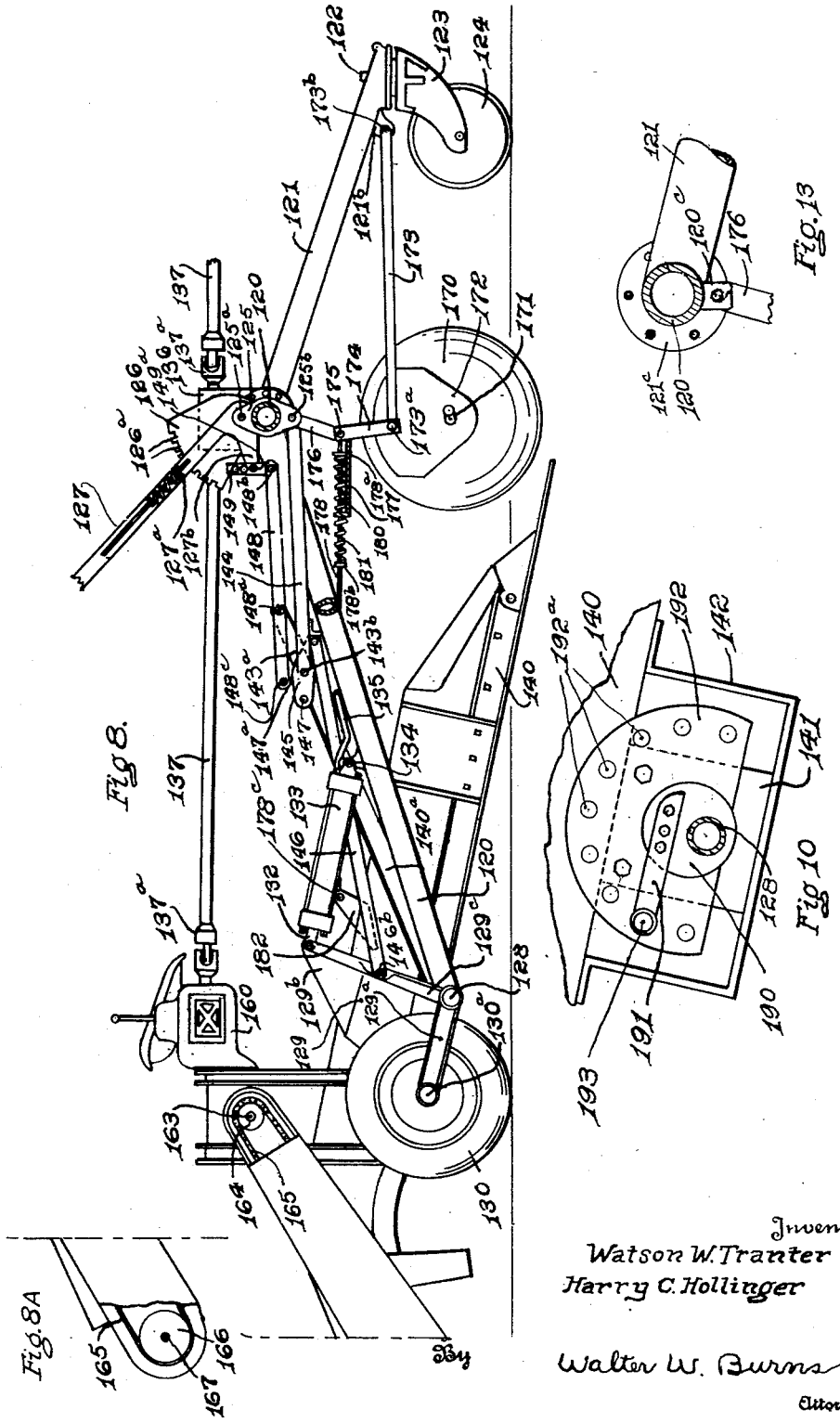

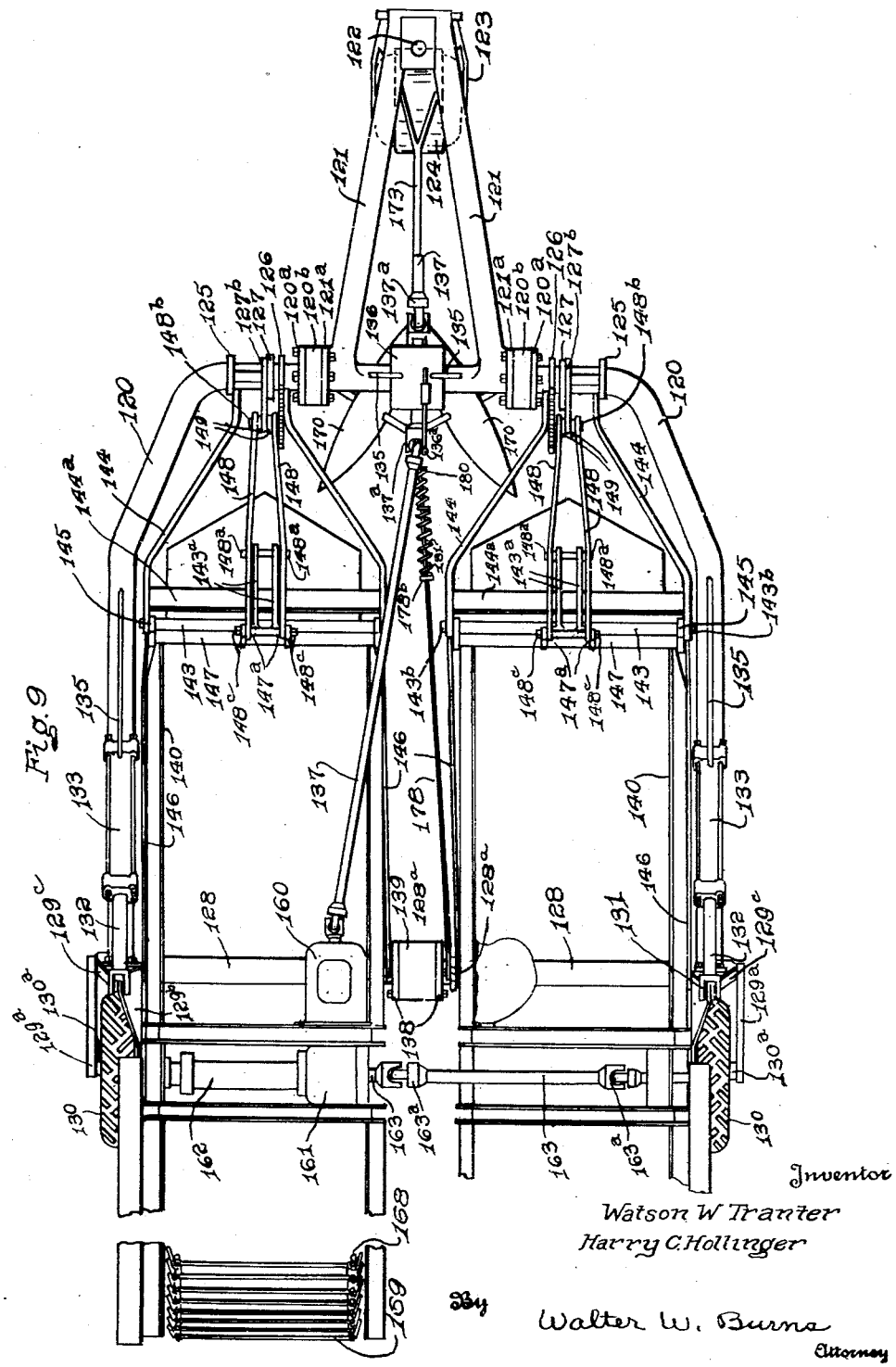

Patented Jan. 22, 1952

2,583,241

UNITED STATES PATENT OFFICE 2,583,241

VEGETABLE DIGGER

Watson W. Tranter and Harry C. Hollinger, York, Pa., assignors to A. B. Farquhar Company, York, Pa., a corporation of Pennsylvania Application March 23, 1949, Serial No. 82,935

16 Claims. (Cl. 55—51)

This invention relates to vegetable diggers and particularly to those diggers wherein the digger mechanism is lifted by power such as hydraulic means.

In the use of diggers, as for example, potato diggers, it is desirable to lift the digging mechanism in as short a travel distance as possible. With potato diggers depending entirely upon the forward movement of the machine for raising the digging mechanism from the ground, it is necessary to travel some distance in getting the digger point out of the ground. This is sometimes inconvenient, especially where the field is cultivated to a line near the edge of the field.

The primary object of this invention is the provision of an improved vegetable digger wherein the digging mechanism is lifted by power.

Another object of the invention is the provision of an improved vegetable digger which may be lifted bodily from the ground.

A further object of the invention is the provision of an improved vegetable digger having a bell crank between the axle and digger supporting frame.

Still another object of the invention is the provision of an improved vegetable digger having a parallel motion lever mechanism for lifting both ends of the digger simultaneously.

A still further object of the invention is the provision of an improved vegetable digger wherein the digging frame is movable relative to the supporting wheels by a mechanism located adjacent to the wheels.

Another and still further object of the invention is the provision of an improved vegetable digger wherein there are provided hydraulic means for lifting both ends of the digging means at the same time.

Another and still further object of the invention is the provision of a plow means between digger mechanisms, where two diggers are used on the same machine, to turn earth and weeds into the paths of the digger means.

Other and further objects of the invention will be apparent to those skilled in the art from a reading of the complete specification and claims.

Referring to the drawing wherein is illustrated an embodiment of the invention,

Fig. 1 is an elevational view of the invention showing the digger means out of the ground, certain parts being broken away for the sake of more clearly illustrating the construction.

Fig. 2 is a view similar to Fig. 1 but with the digger means operating below the ground surface.

Fig. 2a is a view showing the portion of the right side of the machine beyond the broken line of Fig. 2.

Fig. 3 is a plan view of the invention with the moving parts in the position illustrated in Fig. 1.

Fig. 4 is a detail elevational view of the height adjusting mechanism for the rear end of the digger means.

Fig. 5 is a detail view of the means for fastening the frame to the digger supporting shaft.

Fig. 6 is a detail view of the connection of the plow to the main frame.

Fig. 7 is a view similar to Fig. 1 but illustrating a different lifting mechanism.

Fig. 8 is a view of the form of the invention of Fig. 7 but in the position illustrated in Fig. 2.

Fig. 8a is a view showing the portion of the right side of the machine beyond the broken line of Fig. 8.

Fig. 9 is a plan view of the structure illustrated in Figs. 7 and 8.

Fig. 10 is a detail elevational view of a form of height adjusting means for the digger unit.

Figs. 11 and 12 are detail views of the plow-lifting connections for the respective forms illustrated in Figs. 1 to 3 and Figs. 7 to 9.

Fig. 13 is a view similar to Fig. 6 but of the form of the invention illustrated in Figs. 7 to 9.

Similar reference characters refer to the same or similar parts throughout the specification and drawing.

In the embodiment illustrated in Figs. 1 to 6, there are two digging means shown, mounted on a frame comprising a main frame and each having its digger frame.

The main frame consists essentially of a U-shape member 20 of sufficient width to enclose the digging mechanism and having a forwardly extending rigidly connected extension 21 which latter is provided with a caster wheel bearing 22. On the bearing 22 is mounted a fork 23 which carries a caster wheel 24 for supporting the forward end of the main frame 20.

On the forward end of the U-shaped member 20 are rigidly mounted the bracket members 25 having upper and lower bearings 25$^a$ and 25$^b$. Also mounted rigidly on the U-shaped frame member 20 are brackets carrying the segments 26. The teeth 26$^a$ of the segment 26 are arranged in the arc of a circle about the upper bearing 25$^a$ of the bracket 25. Pivoted on the upper bearing 25$^a$ of the bracket 25, is a bell crank depth-adjusting lever 27 having the usual spring-pressed detent 27$^a$ in position to engage any one of the teeth 26$^a$ of the segment 26 according to the desired position of adjustment, as will be later described.

At the rear ends of the U-shaped frame 20, is a shaft 28 which extends the width of the digger and on which are mounted bell crank levers 29 having rearwardly extending arms 29a. At the rear ends of the arms 29a are pivoted wheels 30. As a part of the bell-crank lever and rigid with the arms 29a and supporting the inner ends of the wheel pivots 30a are the plates 29b. Also rigid with the arms 29a and the plate 29b are arms 29c which at their outer ends are connected to the upper portion of the plate 29b. At the point where the plate 29b and the arm 29c come together at 31, is pivoted the outer end of a plunger rod 32 which is connected to a piston within an hydraulic cylinder 33. This hydraulic power cylinder 33 is pivoted at one end to the main frame at 34. The hose connection 35 is connected to an hydraulic pump on the tractor (not shown) or it may be as herein illustrated, connected to an hydraulic pump 36.

The pump 36 is provided with a power shaft 37 which is illustrated as being, though not necessarily, operated from power taken from the tractor.

By expulsion of the plunger 32 by means of the hydraulic pressure from the pump 36, the angular position of the rear end of the main frame 20, with relation to the arm 29a, is changed with the result that the transverse shaft 28 is raised when pressure is applied within the cylinder 33.

The shaft 28 is in the form of a tubular digger body support, and extends across the whole machine to the corresponding wheel support on the opposite side of the digger.

The tubular digger body support 28 is in two sections. The inner end of each section is provided with a flange 38, these two flanges being bolted together with a suitable spacer 39 therebetween.

It will be noted that each side of the forwardly extending member 21 is connected to one side of the U-shaped frame 20, by coacting flanges 20a and 21a with a suitable spacer 20b between the flanges. Suitable bolts hold the coacting flanges and spacers together to form one main bridge-frame 20, 21. If it is desired to operate the digger on rows of various widths, it is only necessary to replace the spacers 20b and 39 with spacers of different width. If and when this is done, since there are two spacers 20b and only one spacer 39, the change in width of the spacer 39 will be twice the change of width of the spacers 20b.

The digger frame 40 is slidably mounted on the tubular supporting member 28 in blocks 41 which are held in position by block guides 42.

The digger frame 40 has forwardly and upwardly inclined frame members 40a which are provided at their forward ends with a rigid transverse tubular bearing member 43, which extends across its own digger frame. Intermediate, the ends of the tubular member 43 are rigidly secured two forwardly extending members 43a. These forwardly extending members 43a carry the vertical weight of the forward end of the digger as will be later described.

Pivoted at the ends of the tubular member 43 and extending forwardly is a draft frame having two forwardly converging arms 44 which are rigidly connected together at their forward ends and are pivoted to the lugs 25 by the pivots 25b, already mentioned. To strengthen the converging arms 44, there is provided a cross brace 44a which extends therebetween and is connected at its ends to the arms 44 near their rear pivot points 43b. In the double row digger as illustrated, the function of the draft frame 44, 44a is to draw its digger forward under any of the varying conditions of work or travel. The details of the lifting mechanism of the forward end of the digger will now be described.

The lifting and lowering of the rear ends of the diggers through operation of the plungers 33 and the turning of the bell crank arms 29 has already been described. As it is desirable to lift both ends of the digger simultaneously, a parallel motion mechanism has been provided which coacts with the rear lifting mechanism to lift both ends equal distances and at the same time.

Fulcrumed also on the pivots 43b of the tubular member 43, are levers 45. To the lower ends of these levers are pivoted the forward ends of the respective forward mechanism lifting links 46 as at 46a. The rear ends of the lifting links 46 are pivotally connected at 46b to the plates 29b of the rear frame lifting mechanism. It will thus be clear that when the plates 29b move rearwardly about the axis of the pivot shaft 28, the levers 45 will approach a vertical position, for a purpose to be presently described.

At the rearward or upper ends of the lever members 45 is a pivoted bar 47 carrying compression arms 47a which at their upper ends are, in turn, pivoted to lifting levers 48. These levers 48 are pivoted intermediate their ends, as at 48a to the forwardly extending members 43a. The forward ends of the levers 48 are pivoted, as at 48b to short compression links 49. At their lower ends, the compression links 49 are pivoted, as at 49a, to the secondary lifting lever 50. There are two of these secondary levers 50 which are pivoted at their rear ends to a pivot 50a in the forwardly extending member 43a which latter is, as already described, integral with the digger frame.

It is to be understood that the inside members 46 are pivoted to upwardly extending arms 28a secured to the shaft 28 adjacent the flanges 38.

The forward end of the lever 50 is pivotally connected to an adjustable tension link 51, at 51a. The upper end of the tension link 51 is pivotally connected, as by any one of many openings at 51b to the arm 27b of the bell crank depth adjusting lever 27, already described.

The power shaft 37 is provided with suitable universal joints 37a which conduct the power through a suitable gear shift box 60 to a differential box 61 from which extend shafts 62, 63 which are provided with suitable universal joints 62a and 63a. These transverse shafts 63 extend to sprockets 64 which carry driving chains 65 for the endless belt of the potato digger. These chains 65 are carried at their lower ends by the sprockets 66 mounted on shafts 67. There is a shaft 67 for each digger upon which are mounted conveyor sprockets 68. These sprockets 68 carry the digger conveyor 69.

A distinct advantage is obtained by this construction having the drive sprockets at the rear, in that the tendency is to hold the conveyor taut on both the elevator and delivery ends of the conveyor.

In order to keep the weeds clear of the diggers, there is provided a plow means, as illustrated, a pair of disk plows which have their forward edges close together to separate the weeds, their rear edges being separated to throw the dirt and weeds to right and left into the paths of the diggers.

The disks 70 are supported on spindle bearings 71 mounted on a plate 72, to which are pivotally connected, as at 73ª, a pair of forwardly extending draft bars 73. These draft bars are pivotally connected, as at 73ᵇ, to lugs 21ᵇ mounted on the lower sides of the forwardly extending arms 21.

Pivotally connected to the plate 72 are a pair of toggle links 74 extending upwardly and connected at their upper ends to a pin pivot 75, to which, in turn, is connected, a second toggle link 76 and a rearwardly extending U-shaped clevis 77. The second toggle link is pivotally connected to a lug 20ᶜ depending from the center of the U-shaped main frame 20.

The U-shaped clevis 77 which, as already stated, is connected at its forward end to the pin pivot 75, has connected to its rear end the disk-depth control rod 78 which extends rearwardly to a hand operated lever 79. The control rod 78 extends through the center of the U-shaped clevis 77 and is slidable therein.

This control rod 78 carries a head 78ª at its forward end and a collar 78ᵇ rearwardly of the clevis 77. Forwardly of the opening where the control rod 78 passes through the clevis 77 is a spring 80 which operates when and after the disks 70 are lifted from their operating position. Between the collar 78ᵇ and the clevis and surrounding the control rod 78 is a spring 81 which is in operation when the disks are in the ground to take the shock as when the disks may engage a stone.

The hand operated lever 79 is fulcrumed at its lower end in a a toothed segment 82 which is rigidly mounted on one of the links 46 at the inner side of one of the diggers. As this link 46 moves rearwardly in its action to assist in raising the forward end of the digger, the toggle formed by the links 74 and 76 tends to reach an acute angle, thus lifting the disks from the ground. In the reverse operation when the diggers are lowered, the toggle links 74 and 76, approach positions in line and the disks 70 are lowered. By adjusting the hand lever 79 to various positions, the depth of the disks 70 can be controlled.

In operation with the power shaft 37 taking power from the tractor to operate the hydraulic pump 36, and with the plungers 32, expelled to bring the digging means above ground, as illustrated in Fig. 1, the operation of the pump control rod 36ª, will open the bleed valve and permit the pump fluid to escape from the cylinders 33 by the hose connections 35. Gravity pulling down on the tube 28, causes the plate 29ᵇ and the arm 29ᶜ to pivot forwardly. This releases the link 46, permits turning of the lever 45, lowering of the rear end of the lever 48 by lowering of the arms 47ª and the rod 47. As the forward end of the lever 50 is held substantially at the same height for any particular adjustment, which in turn holds the pivot point 48ᵇ of the lever 48 at substantially the same height, the lowering of the rear ends of the levers 48 will cause a lowering of the forwardly extending members 43ª. As these forwardly extending members 43ª are rigid with the respective digger frames, it follows that the forward ends of the diggers will go down with the forwardly extending members 43ª.

As the tractor moves forward with the forward ends of the digging mechanism lowered, the digger points will enter the ground. With the proper setting of the speed gear shift 60, the shafts 63, the chains 65 and the endless carriers 66 will operate to lift the dug earth and since the earth will separate and fall through the cross bars of the conveyor, the potatoes or other vegetable being dug, will be separated and be delivered on top of the ground at the rear of the machine.

When it is desired to raise the digging means as at the edge of the field, the operative merely closes the by-pass valve of the hydraulic pump by the operation of the pump control rod 36ª. This causes the hydraulic pump 36 to pump the hydraulic fluid through the flexible tube 35 to the hydraulic cylinders 33. This causes the plungers 33 to be forced out, swinging the plate 29ᵇ rearwardly about the axis 30ª of the wheel 30. As this turning movement takes place, the supporting tubes 28 are raised. This causes the whole rear portions of the diggers to be raised.

As this swinging of the plate 29ᵇ takes place, the link 46 is pulled rearwardly. This action turns the levers 45 so that their tops move forwardly, lifting the arms 47ª and raising the rear ends of the levers 48.

As the forward ends of the levers 48 are held, by the compression links 49, in substantially the same position relative to the frame 20, the upward movement of the rear ends of the levers 48, will raise the intermediate pivot 48ª. This pivot 48ª, as already stated, carries the forward end of the frame extension 43a and lifts the forward end of the frame when this movement takes place.

The lower end of the compression links 49, being pivoted, at 49ª on the secondary lever 50 which is hung at its forward end at 51ª on the tension link 51, and pivotally connected at its rear end at 50ª in the forwardly extending members 43ª, is held in its limited path of movement.

This vertical movement of the forwardly extending member 43ª which, as described, is brought about by the forward movement of the link 46, raises the front end of the digger frame simultaneously with the raising of the rear end. At the same time, the draft frame 44, 44ª holds the digger frame from undesirable forward and rearward movement and provides for the draft of the digging means.

When it is found to be necessary or desirable to adjust the depth to which the digging means will enter the ground, the hand lever 27 with its arm 27ᵇ attached to the secondary lever 50, is moved to a new adjustment. Moving the hand lever 27 forward makes the depth of cut below the ground surface less, while the depth of cut below ground is increased by moving the lever 27 rearwardly.

In order to provide a variable initial height for the rear end of the digger means. There is provided an adjusting device as illustrated, in elevation, in Fig. 4.

Rotatably mounted in the eccentric device 90, is the cross shaft 28. Secured to the eccentric device 90, is an adjusting plate 91 having openings 91ª which register with a corresponding opening in a plate 92 secured to the block 41. A bolt or pin 93 is used to secure the plate 91 in its adjusted position relative to the block 41 and its plate 92. This is accomplished by inserting the pin 93 in the openings 91ª and the opening in the plate 92 on the block 41, and securing the pin in place.

The eccentric 90 is journalled in the slide block 41 which has already been described as being slidably mounted in the guides 42.

When it is desired to change the initial height of the rear end of the digger frame, the rear end of the machine is raised as by use of a lifting jack beneath the cross shaft 28. When sufficiently raised, the pin or bolt 93 is removed and the plate 91 rotated to bring the desired opening 91a into registration with the proper opening in plate 92, to produce the desired initial height for the rear end of the machine. The pin or bolt 93 is then replaced and the jack removed. The sliding action between the block 41 and its guide 42 permits of the rotation of the eccentric without causing the binding of the parts.

In the embodiment illustrated in Figs. 7, 8 and 9, the frame members 120 and 121 are similar to the corresponding members of Figs. 1, 2 and 3. The same is true of the front pivot 122, the fork 123 and the caster wheel 124. The frame members 120, 121 are provided with flanges 120a, 121a, separated by spacers 120b and function in a manner similar to the flanges 20a and spacers 20b already described.

Bracket members 125 are provided with upper bearings 125a and lower bearings 125b to support the lifitng and draft frames, respectively, as will be described. A quadrant 126, having teeth 126a, is mounted rigidly with the frame 120 and is engaged by a latch mechanism 127a to hold the hand lever 127 in adjusted position. The lever 127 is mounted to rotate in the upper bearing 125a. An arm 127b forms a part of the hand lever 127 and supports, in adjustable positions, the digger lifting mechanism to be later described.

At the rear of the U-shaped frame 120, is a shaft 128 which extends across the machine and upon which are supported the digger frames. On the ends of the shaft 128 are bell crank levers 129. One arm 129a extends rearwardly from the shaft 128 and supports the outer side of the wheel by the pivot 130a. The inner end of the pivot 130a is supported by a plate member 129b which is also rigid with the shaft 128. An arm 129c which acts as a brace, extends upwardly and forms a rigid part of the lever 129. At the upper ends of the plate 129b and the arm 129c, where they join at 131, is pivoted the piston rod 132 of the hydraulic cylinder 133. To give this cylinder 133 pivotal movement in a substantially vertical plane, its forward end is pivoted as at 134 to the frame 120. Hose connections 135 connect the cylinders 133 to the hydraulic pump 136 or the hose connection may connect to a pump on the tractor (not shown).

The hand operated rod 136a controls the operation of the hydraulic pump 136.

The operation of the hydraulic pump 136 and the cylinders 133 with their cooperating parts, causes a change in angular relation between the arm 129a and the frame 120. This operation is similar to that described for Figs. 1 to 3.

The drive shaft 137 with its universal joints 137a, extends through the pump 136, to operate the latter and also to operate the gearing and cooperating parts which move the elevator as will be described.

At the ends of sections of the shaft 128 are flanges 138, between which is a spacer pad which may vary in thickness as it is desired to space the diggers closer together or farther apart. In connection with the changes in distance between diggers, it is to be noted that for any change in the thickness of the spacer 139, each of the spacers 120b will be changed accordingly but in an amount half as much.

The digger frames 140 carry the digging mechanisms, the details of which are not a part, per se, of this invention. These frames are carried by and have a limited movement relative to the shaft 128 already described. The frame 140 rests upon blocks 141 which are held in place by the slide guides 142. A height-varying mechanism connects the shaft 128 with the block 141 and will be later described.

Frame members 140a are provided on the frame 140 to provide draft devices and also to assist in the lifting operation. Connecting the upper or forward ends of the members 140a is a cross member 143 which extends over the digger and has two forwardly projecting arms 143a. The purpose of these arms will later appear.

A draft frame comprising the side members 144 and the cross member 144a is provided to take care of the draft of the diggers. The forward ends of the side members 144 are connected to the lugs 125 by the pivots 125b. The rear ends of the side members 144 are pivotally connected to the pivots 143b located at the ends of the cross member 143.

Fulcrumed on the pivots 143b adjacent the ends of the side members 144 are levers 145. At the lower ends of the levers 145, at 146a are pivoted the links 146 which extend rearwardly and on the outsides of the digger frames, are connected at 146b to the plates 129c of the bell crank lever 129 to cooperate in the lifting operation. The links 46 on the insides of the digger frames are pivoted to arms 128a which are mounted rigidly on the shaft 128.

From the construction described, it will be clear that when the plunger rod 132 as shown in Fig. 8 is forced outwardly to a position as shown in Fig. 9, the links 146 will be pulled rearwardly and the levers 145 turned toward a substantially upright position, for a purpose to be described.

Pivotally connecting the upper or rearward ends of the levers 145, is a cross shaft 147 which carries rigidly therewith, the arms 147a. These arms 147a, and the shaft 147, perform the function of a link, the outer or upper ends of the arms 147a, being connected to the rear ends of the levers 148 at 148c. The levers 148 are fulcrumed at the pivots 148a to the outer or forward ends of the arms or extensions 143a already described. The forward ends of the levers 148 are connected at 148b, to hanger links 149, the upper ends of which are pivotally connected at 149a to the lower arm 127b of the hand adjusting lever 127.

The drive or power shaft 137, at its rear end, is connected to the gear shift box 160 which operates the gears in the gear box 161. To one elevator is connected the shaft in the housing 162—on the digger which carries the gear box 161. A shaft 163 having universal joints 163a extends from the gear box 161 and operates the digger elevator for the other digger.

On the ends of the shaft in the housing 162 and the shaft 163 are sprocket wheels 164 which drive chains 165. The chains 165 at their lower ends are mounted on sprockets 166 which, in turn, are carried by the shafts 167.

Within the sides of the digger 140 and on each shaft 167 are a pair of sprocket wheels 168 which carry the elevators 169. Since the details of the construction of the elevators are, per se, not a part of this invention, are well known in the art, and for the sake of clearness and proper illustration, the elevators have been indicated but not shown in full.

Except for the connection of the operating link, the weed clearing plow construction in the form illustrated in Figs. 7 to 9 is similar to that illustrated in Figs. 1 to 3.

The disks 170 are supported on spindle bearings 171 mounted on the plate 172, to which are pivotally connected, as at 173a, a pair of forwardly extending draft bars 173. These draft bars 173 are pivotally connected, as at 173b, to lugs 121b mounted on the lower sides of the forwardly extending arms 121.

Pivotally connected to the plate 172 are a pair of twin toggle links 174 extending upwardly and connected at their upper ends to a pin pivot 175, to which, in turn, is connected another toggle length 176 and a rearwardly extending U-shaped clevis 177. The second toggle link is pivotally connected to a lug 121c depending from the center of the U-shaped main frame member 121.

The U-shaped clevis 177 which, as already stated, is connected at its forward end to the pin pivot 175, has connected to its rear end the disk-depth control rod 178, which extends rearwardly and is pivotally connected at 178c to an arm 182 which is rigidly connected to one of the inner links 146.

This control rod 178 carries a head 178a at its forward end and a collar 178b rearwardly of the clevis 177. Forwardly of the opening where the disk-depth control rod 178 passes through the clevis 177, is a spring 180 which operates when and after the disks 170 are lifted from their operative position. Between the collar 178b and the clevis 177 and surrounding the control rod 178 is a spring 181 which is in operation when the disks are in the ground to take the shock as when the disks may engage a stone. The spring 180 operates when the disks are raised.

As the link 146, at the inner side of one of the diggers and to which the rod 178 is attached, moves to the rear in its action to assist in raising the forward end of the digger, the toggle formed by the links 174 and 176, tends to reach an acute angle, thus lifting the disks from the ground. In the reverse operation, when the diggers are lowered, the toggle links 174 and 176 approach positions in line and the disks 170 are lowered.

In order to vary the height of the front end of the diggers, the use of various openings in the hanger links 149 are used for the pivot 149a. The height of the rear of the digger is varied by a height adjusting means which will now be described.

The axle 128 is surrounded by an eccentric member 190 in which the shaft is free to turn. (See Fig. 10.) The eccentric is mounted to oscillate in the block 141 already described. To the member 190 is bolted an arm 191 having an opening at its outer end which may be registered with any one of a series of openings 192a of a plate 192 which is securely bolted to the block 141. A pin or bolt 193 is provided to secure the arm 191 in a predetermined relation to the plate 192 by the securing of the pin or bolt 193 in the opening of the arm 191 and any one of the openings of the plate 192. From the construction, it will be clear that by turning the eccentric 190 by its arm 191, the height of the frame 140 will be varied relative to the axis of the shaft 128.

The operation of the lifting mechanism of the digger means follows—Assuming the digger means to be in the ground, the control rod 136a of the hydraulic pump 136 is operated which starts application of pressure within the cylinders 133. As the plungers 132 are forced backwardly, the angular relation between the bell-crank 129 and the frame 120 is changed, raising the shaft 128 and lifting the rear end of the digger means.

At the same time, the bell-crank 129 pulls the link 146 rearwardly, raising the lever 145 to a nearly vertical position. This movement of the lever 145 places the cross shaft 147 at a higher position relative to the pivot 143b, thus lifting the rear end of the lever 148, at the pivot 148c, about its forward pivot 148b. And since the lever 148 is pivoted at its forward end to the lower bearing 125b of the bearing member 125, it follows that the fulcrum of the lever 148, connected to the forward end of the extension 143 at 148a, will raise the forward end of the frame member 140a to which it is rigidly connected. And as the forward end of the frame member 140a is raised, it follows that the pivot 143a will be raised, which will further act upon the connections to accentuate the upward movement.

And since during the upward movement of the forward end, the rear end is raised, both ends are raised simultaneously.

The lifting of the disks 170, when the digger means is raised, is similar to the lifting of the disks 70 as already described.

When it is desired to have the digger means enter the ground for vegetable digging, it is only necessary to operate the hydraulic control rod 136a to release the plungers 132. The parts return to their former positions and forward movement will cause the digger means to enter the ground.

While a form of the invention has been illustrated and described in detail, it is to be understood that the disclosure is merely illustrative and that modifications and changes in the construction may be made and the number of digger units varied without departing from the spirit of the invention and within its scope, as claimed.

Having described the invention, what is claimed is:

1. A vegetable digger having a frame, supporting wheels for the frame, a pair of digging means in relative side-by-side positions, coacting elevating and delivery means extending from the digging means at a point forward of the wheels to the delivery point rearward of the wheels, a toggle mechanism connected to the frame and wheels and supporting the plow means and coacting means for simultaneously lifting the digging means and for operating the toggle mechanism to lift the plow means.

2. A vegetable digger having a frame, supporting wheels for the frame, a pair of digging means in relative side-by-side positions, coacting elevating and delivery means extending from the digging means at a point forward of the wheels to the delivery point rearward of the wheels, a toggle mechanism connected to the frame and wheels and supporting the plow means and connecting means for simultaneously lifting the digging means and for operating the toggle mechanism to raise the plow means and adjusting devices for independently adjusting the depth of earth penetration of the separate digging means.

3. A vegetable digger having a frame, supporting wheels for the frame, a pair of digging means in relative side-by-side positions, coacting elevating and delivery means extending from the digging means at a point forward of the wheels to the delivery point rearward of the wheels, a toggle mechanism connected to the frame and wheels and supporting the plow means, power means for simultaneously lifting the front and rear portions of the digging means and connections, including a link, between the lifting means and the toggle mechanism to lift the latter from the former.

4. A vegetable digger having a frame, supporting wheels for the frame, a digging means, coacting elevating and delivery means extending from the digging means forward of the wheels to the point of delivery of the delivery means rearward of the wheels, an adjustable means connecting the wheels and digging means for giving a variable initial adjustment to the rear of the digging means, a second adjustable means connecting the frame with the forward portion of the digging means for giving a variable adjustment to the forward end of the digging means and coacting means for lifting both ends of the digging means simultaneously and in vertical relation to the wheels.

5. A vegetable digger having a frame, supporting wheels for the frame, a digging means, coacting elevating and delivery means extending from the digging means forward of the wheels to the point of delivery of the delivery means rearward of the wheels, an adjustable means connecting the wheels and digging means for giving a variable initial adjustment to the rear and of the digging means, a second adjustable means connecting the frame with the forward portion of the digging means for giving a variable initial adjustment to the forward end of the digging means, coacting means for lifting both ends of the digging means simultaneously and power means for operating the coacting means.

6. A vegetable digger having a frame, supporting wheels for the frame, a digging means, coacting elevating and delivery means extending from the digging means forward of the wheels to the point of delivery of the delivery means rearward of the wheels, an adjustable mechanism connecting the wheels and digging means for giving a variable initial adjustment to the rear end of the digging means, a second adjustable mechanism connecting the frame with the forward portion of the digging means for giving a variable adjustment to the forward end of the digging means, coacting means for lifting both ends of the digging means simultaneously and hydraulic power mechanism for bodily lifting the digging means.

7. A digger having supporting wheels, a main frame, a digger frame adjustably mounted thereon, elevating and delivery means on the digger frame, and a pre-set height-determining means between the digger frame and wheels for predetermining, while in the raised position, the height the rear of the digger frame will reach when the latter is lowered to operative position.

8. A digger having supporting wheels, a main frame, a digger frame adjustably mounted thereon, elevating and delivery means on the digger frame lifting means between the wheels and digger frame to raise the digger frame from working position, and pre-set height-determining means for predetermining, while in the raised position, the height the rear of the digger frame will reach when the latter is lowered to operative position.

9. A digger having supporting wheels, a main frame, a digger frame adjustably mounted thereon, elevating and delivery means on the digger frame, the elevating means being in position to deliver to the delivery means, the wheels being located rearward of the receiving end of the elevating means and forward of the delivery point of the delivery means, and a height adjusting means between the wheels and the rear portion of the main frame and digger frame to raise and lower the rear end of the digger frame from and to operative position.

10. A digger having supporting wheels, a main frame and a digger frame adjustably mounted thereon and carried at their rear ends by the wheels the frames being relatively adjustable, elevating and delivery means on the digger frame, the elevating means being in position to deliver to the delivery means, the wheels being located rearward of the receiving end of the elevating means and forward of the delivery point of the delivery means and a bell crank lever connection between the wheels and the main frame to vary the height of the main frame at will.

11. A digger having supporting wheels, a main frame and a digger frame adjustably mounted thereon and carried at their rear ends by the wheels the frames being relatively adjustable, elevating and delivery means on the digger frame, the elevating means being in position to deliver to the delivery means, the wheels being located rearward of the receiving end of the elevating means and forward of the delivery point of the delivery means and a bell crank lever connection between the wheels and the digger frame to vary the height of the digger frame.

12. A digger having supporting wheels, a main frame and a digger frame adjustably mounted thereon and carried at their rear ends by the wheels the frames being relatively adjustable, elevating and delivery means on the digger frame, the elevating means being in position to deliver to the delivery means, the wheels being located rearward of the receiving end of the elevating means and forward of the delivery point of the delivery means, a connection between the wheels and the rear of the digger frame to vary the height of the rear of the digger frame, and connections between the rear wheels to vary the height of the forward end of the digger frame simultaneously.

13. A digger having supporting wheels at the rear and supporting means at the forward end, a main frame, a digger frame adjustably mounted thereon, the main and digger frames being supported mainly by the rear wheels and adjustable relatively to each other, a bell crank lever connection between the wheels and the digger frame for varying the height of the rear end of the digger frame and lever means and connections for simultaneously varying the height of the opposite end of the digger frame.

14. A digger having supporting wheels, a main frame and a digger frame adjustably mounted thereon and carried at their rear ends by the supporting wheels the frames being relatively adjustable, elevating and delivery means on the digger frame, the elevating means being in position to deliver to the delivery means, the wheels being located rearward of the receiving end of the elevating means and forward of the delivery point of the delivery means, a connection between the wheels and the rear of the digger frame to vary the height of the rear of the digger frame, ground engaging means for supporting the front ends of the main frame and digger frame and operating connections including a predeterminedly depth-setting means, between the wheels and the forward end of the digger frame to raise and lower the forward end of the digger frame and to permit its entry into the earth to a predetermined depth, simultaneously with the lowering of the rear of the digger frame.

15. A digger having supporting wheels, a main frame and a digger frame adjustably mounted thereon and carried at their rear ends by the supporting wheels the frames being relatively adjustable, a plow on the digger frame, a connection between the wheels and the rear portion of the digger frame including a pre-set height-determining means for predetermining, while in raised position, the height the rear of the digger frame will reach when the latter is lowered to operative position and for raising and lowering the rear of the digger frame, and a second connection connected to the first connection, including a depth-setting adjusting device, for raising and lowering the forward end of the digger frame and plow from and to operative position at a predetermined depth of the plow below the surface of the earth.

16. A digger having a front wheel support and a rear wheel support, a main frame, a digger frame adjustably mounted thereon, elevating and delivery means on the digger frame the elevating means being in position to deliver to the delivery means, the rear wheel support being located rearward of the receiving end of the elevating means and forward of the delivery point of the delivery means, a bell crank connection between the rear wheels and the main and digger frames, predetermining means for setting the connections between the wheels and frames to determine, while in the out-of-operation, position the height above and angle to the ground which will be occupied by the digger frame when in operative position.

WATSON W. TRANTER.
HARRY C. HOLLINGER.

REFERENCES CITED

The following references are of record in the file of this patent:

UNITED STATES PATENTS

| Number | Name | Date |
| --- | --- | --- |
| 2,209,282 | Rodin | July 23, 1940 |
| 2,215,516 | Schooler | Sept. 24, 1940 |
| 2,325,870 | Mott | Aug. 3, 1943 |
| 2,410,918 | Acton | Nov. 12, 1946 |
| 2,469,622 | Acton | May 10, 1949 |